United States Patent [19]

Perry et al.

[11] Patent Number: 4,885,578
[45] Date of Patent: Dec. 5, 1989

[54] IN BAND CONNECTION ESTABLISHMENT FOR A MULTIPLE MULTI-DROP NETWORK

[75] Inventors: Kenneth J. Perry, Riverdale; Yannick J. Thefaine, Beacon; Brent T. Hailpern, Katonah, all of N.Y.; Lee W. Hoevel, Spring Valley, Ohio; Dennis G. Shea, Danbury, Conn.

[73] Assignee: International Business Machines Corporation, Armonk, N.Y.

[21] Appl. No.: 940,891

[22] Filed: Dec. 12, 1986

[51] Int. Cl.⁴ .............................................. H04Q 1/00
[52] U.S. Cl. ......................... 340/825.52; 340/825.05; 340/825.53; 364/131; 370/85.1
[58] Field of Search ................. 364/200, 900, 131-133; 455/58; 370/85, 95, 96, 90, 94, 93, 91; 340/825.03, 825.07, 825.53, 825.08, 825.5, 825.51, 825.52, 825.65

[56] References Cited

U.S. PATENT DOCUMENTS

| | | | |
|---|---|---|---|
| 3,755,628 | 8/1973 | Games et al. | 370/85 |
| 3,903,499 | 9/1975 | Oliver | 340/825.52 X |
| 4,035,772 | 7/1977 | Abe et al. | 340/825.52 |
| 4,063,220 | 12/1977 | Metcalfe et al. | 370/93 X |
| 4,287,508 | 9/1981 | Arita et al. | 340/825.07 |
| 4,332,027 | 5/1982 | Malcolm et al. | 455/58 X |
| 4,486,750 | 12/1984 | Aoki | 370/91 X |
| 4,568,930 | 2/1986 | Livingston et al. | 340/825.5 |
| 4,580,261 | 4/1986 | Pelotte | 370/85 |
| 4,696,019 | 9/1987 | Tulpule et al. | 364/131 |

FOREIGN PATENT DOCUMENTS 0046373  3/1982  Japan .................................. 364/131

*Primary Examiner*—Ulysses Weldon
*Attorney, Agent, or Firm*—Jack M. Arnold

[57] ABSTRACT

A system for establishing connections between processors in a distributed system of processors connected by a multiple multi-drop network. No wires are needed in addition to those already present in an existing network. In such a network connecting n processors, each processor is connected to all others by n identical multi-drop links. Links are assigned to processors on a one-to-one basis and a processor may transmit messages only on its assigned link. Processors may receive messages on any of these links, thereby enabling a processor to communicate with all others. The advantage of such a network over a single multi-drop link is that there is no contention for a shared link since each processor has a unique transmit line. In addition, no central control means is required for the network, as completely distributed control is utilized.

4 Claims, 4 Drawing Sheets

SYSTEM INITIALIZATION

ESTABLISH CONNECTION FROM PROCESSOR I TO J

IN BAND CONNECTION ESTABLISHMENT FOR A MULTIPLE MULTI-DROP NETWORK

DESCRIPTION

1. Technical Field

The invention is in the field of data processing, and in general processor to processor interconnection systems. In particular, a method of establishing connections between processors in a distributed system of processors connected by a multiple multi-drop network is provided, in which no wires are needed in addition to those already present in an existing network.

2. Background Art

A number of processor interconnect systems are known in the art, each having certain advantages and disadvantages. Such systems generally include a central control means or separate control and data paths between the respective processors.

Representative processor interconnect art is set forth below, and is generally distinguished from the instant invention which is directed to a multiple multi-drop network.

U.S. Pat. No. 4,434,463 to Quinquis et al, discloses a processor to processor interconnection system, which uses multiple busses, but not individual multi-drop transmit lines for eachc processor. Further, Quinquis doesn't allow each processor to directly communicate with all others. Instead, some messages must be relayed through intermediate processors. In contrast, a multiple multi-drop network allows direct communication between all processors.

U.S. Pat. No. 4,491,915 to Forquer et al, discloses a processor to memory interconnection for multiple processors rather than a processor to processor interconnection system. Further, a central control means is required, asa there is no distributed control.

U.S. Pat. No. 3,984,819 to Anderson is a multiple bus processor wherein each processor is not connected to all others. Therefore, Anderson is subject to contention which a multi-drop network avoids. Further, Anderson requires separate data and control paths, whereas the multi-drop network requires data lines only, with no need for separate control.

U.S. Pat. No. 3,753,234 to Gilbert et al, discloses a multicomputer system with simultaneous data exchange between computers. A centralized "computational flow director" is utilized, that is, a central control unit. Further, separate data and control paths are utilized.

According to the present invention, there is a network connecting n processors, wherein each processor is connected to all others by n identical multi-drop links. Links are assigned to processors on a one-to-one basis and a processor may transmit message only on its assigned link. Processors may receive messages on any of these links, thereby enabling a processor to communicate with all others.

The advantage of such a network over a single multi-drop link is that there is no contention for a shared link since each processor has a unique transmit line. In addition, no central control means is required for the network, as completely distributed control is utilized. Further, no wires are needed in addition to those already present in the existing network. By eliminating all additional wires, the primary impediment to building larger multiple multi-drop networks of any size is reduced.

DISCLOSURE OF THE INVENTION

A method of establishing communication between n processors connected via n identical multi-drop links is disclosedd. Each processor is connected to all other procesors by the n identical multi-drop links, with each one of the n processors being assigned a predetermined one of the n multi-drop as a transmit link. A given processor may transmit a message to another processor only on the assigned predetermined link of the given processor, and may receive messages on any one of the n multi-drop links.

BEST MODE OF CARRYING OUT THE INVENTION

This invention solves the problem of establishing connections between processors in a distributed system of processors connected by a multiple multi-drop network. The solution requires no wires in addition to those already present in a multiple multi-drop network.

In a multiple multi-drop network connecting n processors (refer to FIG. 1), each processor is connected to all others by n identical multi-drop links. Links are assigned to processors on a one-to-one basis and a processor may transmit messages only on its assigned link. For example, in FIG. 1, processor 1 (Block 100) has a link designated as Proc_1_Transmit_Line (line 110). Processors may receive messages on any of these links, thereby enabling a processor to communicate with all others. There is no contention for a shared link since each processoro has its own unique transmit line. For every processor I in the system, one Proc_I_Transmit_Line is allocated to it.

Figure 1:
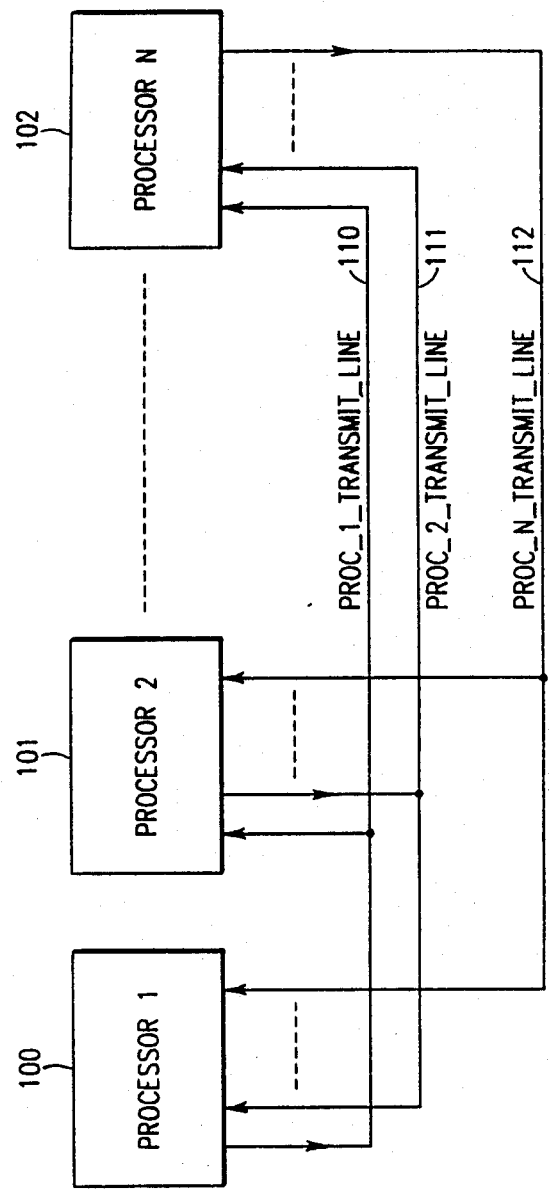
FIG. 1 is a block diagram representation of a multiple multi-drop network connecting n processors.
Figure 2:
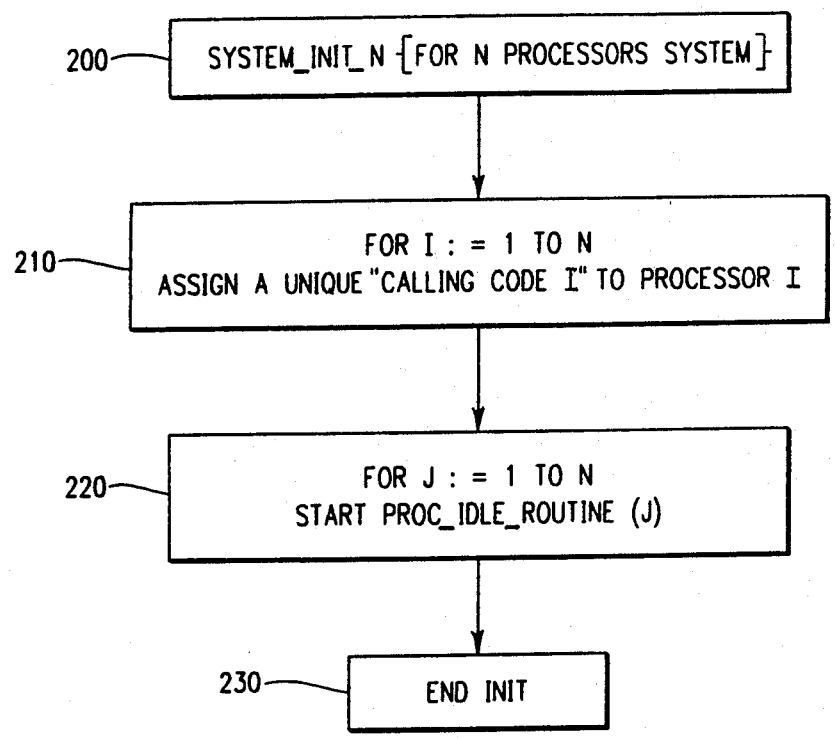
FIG. 2 is a flow chart representing the system initialization protocol for the multiple multi-drop network of FIG. 1.
Figure 3:
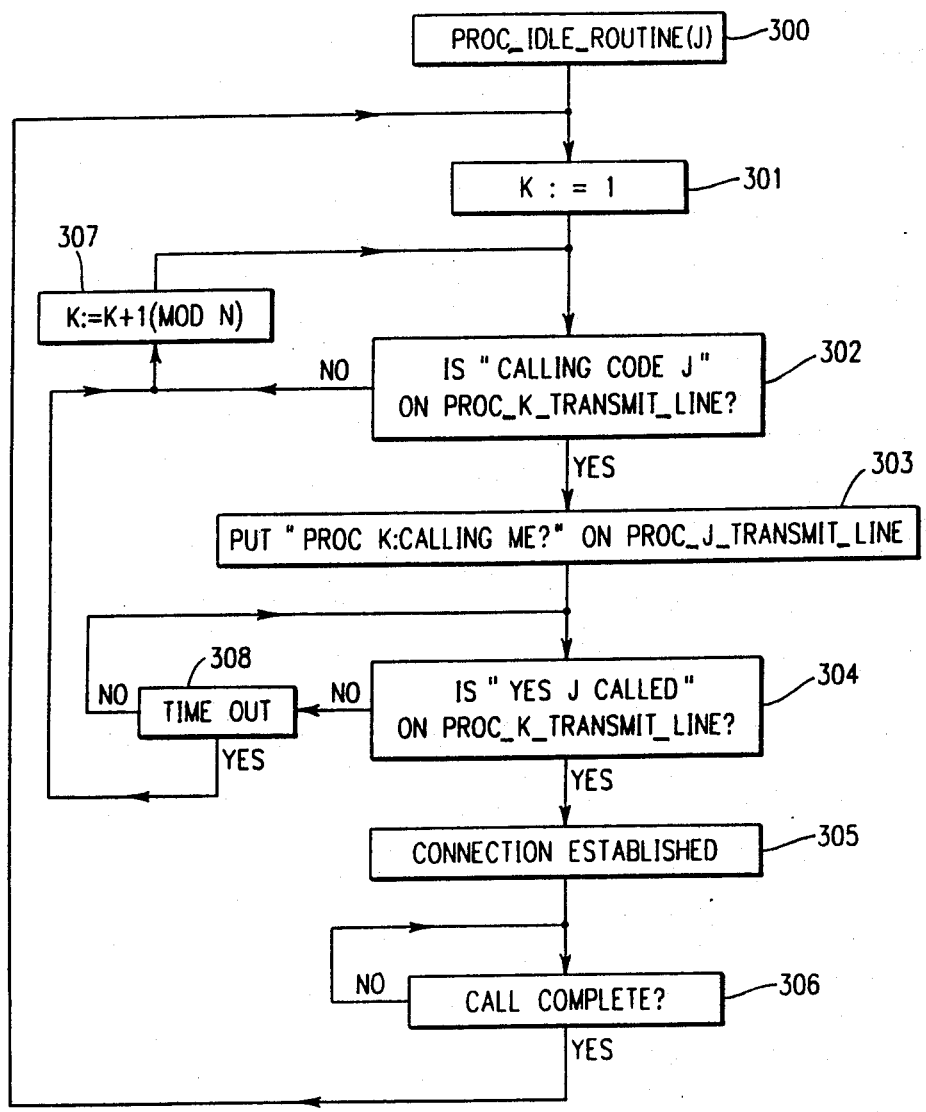
FIG. 3 is a flow chart represening the processor idle routine protocol which is shown generally in FIG. 2.
Figure 4:
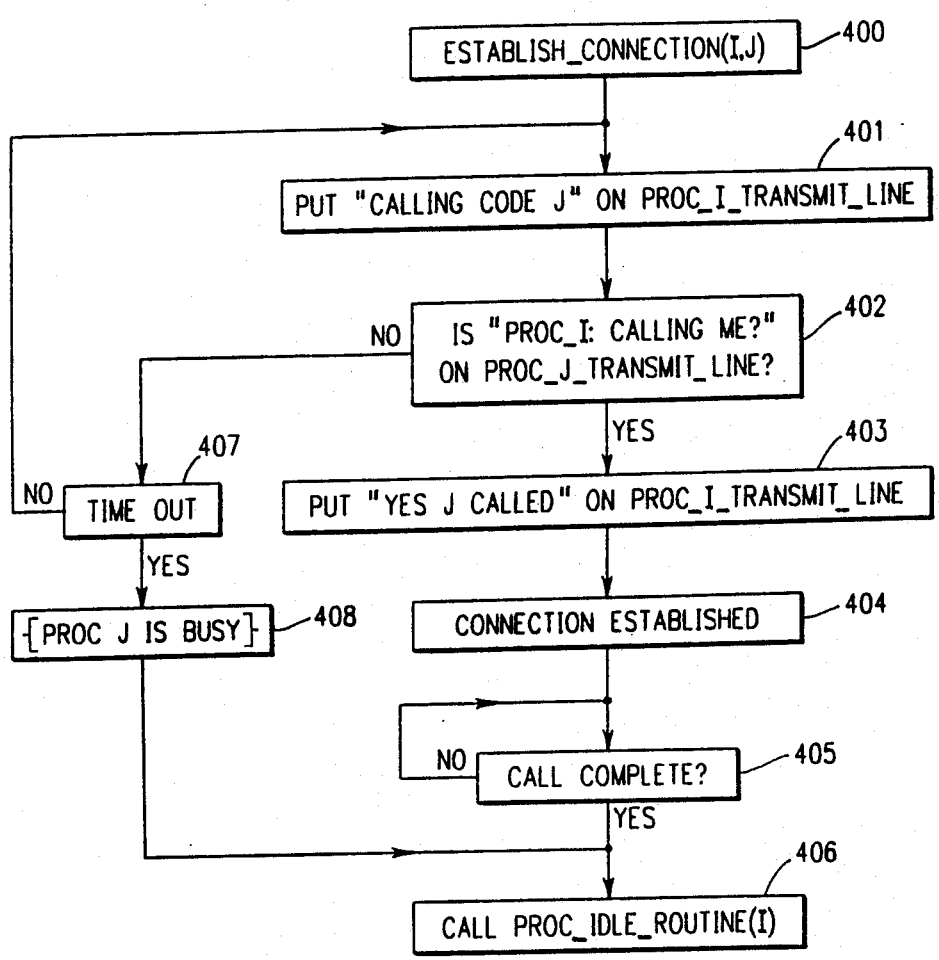
FIG. 4 is a flow chart representing the establish connection protocol for the multiple multi-drop network of FIG. 1.

The flowchart embodying the protocol for the multiple multi-drop network of FIG. 1 is provided in FIGS. 2 through 4. The process begins with system initialization as shown in FIG. 2. In process block 210, a unique bit pattern (called a calling code) is assigned to each processor. For every processor I in the system, a unique calling code referred to as "Calling Code I", is assigned. Once this has been completed for all n processors, procedure Proc_Idle_Routine is started on each processor, as showon in process block 220. For example, for processor J, the Proc_Idle_Routine (J) is invoked. Once all processors have the processor idle routine started, the system initialization is complete.

At this point, each processor in the system is executing its copy of the Proc_Idle_Routine. The flowchart of this routine is shown in FIG. 3. The purpose of the Proc_Idle_Routine is to allow processor J to detect when some other processor desires to establish a connection with it for the purpose of subsequent communication. The execution of the idle routine for processor J is set forth below. A processor is idle unless it has a connection established with another processor in the system. First, in process block 301 a counter K is initialized to one. Next, processor J checks to see if it is being called by pocessor K. Processor J accomplishes this by checking to see if is calling code (referred to as "Calling Code J" in decision block 302) is on the calling processors transmit line (in this case it is the Proc_K_Transmit_Line). If the code is not present then processor J is not being called. In this case the counter variable K is incremented modulo N (see process block 307). Once the counter is updated, the processor checks to see if the new processor K is calling it (decision block 302). This results in a round-robin search order for detection of a caller.

If the calling code "Calling Code J" was present on processor K's transmit line (Proc_K_Transmit_Line), then processor J proceeds to put the message "Proc K: Calling ME?" on its transmit line which is known as Proc_J_Transmit_Line (process block 303). After placing the message, processor J waits to see if i receives an acknowledgement back. Processor J checks to see if the acknowledgement message "Yes, J Called" appears on the transmit line Proc_K_Transmit_Line. This is accomplished in decision blocks 304 and 308. If it appears, the connection is established (process block 305) and the two processors proceed to communicate with each other. Once the processors are finished communicating decision block 306 is exited and the call is complete. Processor J returns to the idle state, and loops back to the start (process block 301) and starts checking again to see if it is being called.

Restated, with respect to FIG. 1, if the "Calling Code 1" was present on Processor 2's transmit line 111 (Proc_2_Transmit_Line), then Processor 1 proceeds to put the message "Proc 2: calling me?" on its transmit line 110 (Proc_1_Transmit_Line). After placing the message, processor 1 waits to see if it receives an acknowledgement back. Processor 1 checks to see if the acknowledgement message "Yes, 1 Called" appears on the transmit line 111 (Proc_2_Transmit_Line) of processor 2.

If Processor J did not see the message "Yes, J Called" on the Proc_K_Transmit_Line, it will time out (decision block 308). If this occurs the counter K is incremented modulo N (decision block 307) and the processor checks to see if the next processor K is calling him. In the protocol, all processors in the system, are continually looping to detect if someone is calling them.

Next, the process of establishing a connection is described (refer to FIG. 4). If a processor is not busy with a call it can try to establish a connection with another processor in the system. If processor I wants to establish a connection with processor J, it would execute the procedure Establish_Connection (I,J) as shown in FIG. 4.

The purpose of Establish_Connection (I,J) is to allow processor I to signal processor J that it desires a connection to be established for the purpose of subsequent communication. Processor J detects this desire through the previously described Proc_Idle_Routine (J) (FIG. 3). In Establish_Connection (I,J), processor I first places on its transmit line (known as Proc_I_Transmit_Line), the calling code for processor J, which is "Calling Code J". Then it waits to see if the message "Proc I: Calling Me?" appears on the Proc_J_Transmit_Line (decision block 402). If the message is not there, and the process has not timed out (decision block 407), then it resends the request and checks again. If the process times out (decision block 407) then processor I concludes the processor J is busy and terminates it's connection request. Upon termination, processor I returns to the idle state by executing the Proc_Idle_Routine (I).

If the "Proc_I: Calling Me?" does appear on processor J's transmit line, then processor I acknowledges with the message "Yes, J Called" on its transmit line (process block 403). By this action, the connection has been established: Processor I is listening to processor J's transmit line (and vice-versa) and each processor knows the other is listening. Therefore, processors I and J may begin communicating. When the call is complete (decision block 405), the processors return to their idle state. Calling processor I returns to its idle state by invoking the Proc_Idle_Routine (I) (process block 406).

Restated, with respect to FIG. 1, the purpose of Establish_Connection (1,2) is to allow processor 1 to signal processor 2 that it desires a connection to be established for the purpose of subsequent communication. Processor 2 detects this desire through the previously described Proc_Idle_Routine (J) (FIG. 3). In Establish_Connection (1,2), processor 1 first places on its transmit line 110 (Proc_1_Transmit_Line), the calling code for processor 2, which is "calling code 2". Then it waits to see if the message "Proc_1: calling me?" appears on the Proc_2_Transmit_Line 111. If the process times out as set forth generally above, processor 1 concludes processor 2 is busy and terminates its connection request. Upon termination, processor 1 returns to the idle state by executing Proc_Idle_Routine (1).

If the "Proc_1: calling me?" does appear on processor 2's transmit line 111 (Proc_2_Transmit_Line), then processor 1 acknowledges with the message "Yes, 2 called" on its transmit line 110 (Proc_1_Transmit_Line). By this action, the connection has been established: Processor 1 is lisening to processors 2's transmit line (and vice-versa) and each processor knows the other is listening. Therefore, processors 1 and 2 may begin communicating. When the call is complete, the processors return to their idle state. Calling Processor 1 returns to its idle state by invokinig the Proc_Idle Routine 1, as previously described with respect to FIG. 3.

In summary, a method has been described for establishing connections between processors in a distributed system of processors connected by a multiple multi-drop network.

INDUSTRIAL APPLICABILITY

It is an object of the invention to provide an improved multiple processor interconnection mechanism.

It is another object of the invention to provide an improved in band connection mechanism for a multiple multi-drop network.

It is yet another object of the invention to provide an improved in band connection mechanism for a multiple multi-drop network in which no additional wires are needed in addition to those already present in the existing network.

It is still another object of the invention to provide an improved mechanism for establishing connections between processors in a distributed system of processors connected by a multiple multi-drop network in which no wires are needed in addition to those already present in the existing network.

It is a further object of the invention to provide an improved mechanism for establishing connections between processors in a disstributed system of precessors connected by a multiple multi-drop network for n processors, wherein each processor is connected to all others by n identical multi-drop links. Links are assigned to processors on a one-to-one basis and a processor may transmit messages only on its assigned link. Processors may receive messages on any of these links, thereby enabling a given processor to communicate with all others.

Having thus described our invention, what we claim as new, and desire to secure by Letters Patent is:

1. A method of establishing communication between n processors connected by n multi-drop links; where n is an integer, said method comprising the steps of:

assigning each one of said n processors a different predetermined one of said n multi-drop links as a contention free transmit link;

assigning each one of said n processors a different unique calling code;

transmitting by a first one of said n processors on its assigned transmit link the unique calling code of a second one of said n processors with which said first one of said n processors wants to establish a connection for communication purposes;

checking, in a round robin search order, all links other than its own transmit link, by said second one of said n processors to determine if it is receiving its own calling code on the assigned transmit link of anaother one of said n processors; and establishing a connection between said first and second one of said n processors in response to said second one of said n processors determining that said first one of said n processors is transmitting said second one of said n processors unique calling code on said first one of said n processors assigned transmit link.

2. The method of claim 1, wherein said step of establishing a connection is completed after determining that said second one of said n processors is not already busy.

3. A method of establishing connections between processors I and J in a distributed system of n processors connected by n identical multi-drop links, where n is an integer, with each of said n processors being assigned a predetermined one of said n multi-drop links as a contention free transmit link and all other links being receive links, said method comprising the steps of:

(1) assigning each processor I of said n processors a unique calling code, termed "calling Code I", which distinguishes each one of said n processors from another;

(2) starting a processor idle routine, termed "Processor Idle Routine J", for each processor J of said n processors, said "Processors Idle Routine J" including the step of:

(a) checking each of the transmit links of the other ones of said n processors for the presence of a signal termed "Calling Code J", which is indicative of the processor assigned that transmit link desiring to be connected to processor J;

(3) starting an "establish a connection between a processor I and a processor J routine: said" establish a connection routine"including the steps of:

(a) putting "Calling Code J" on processor I's transmit line, which is indicative of processor I desiring to be connected to processor J;

(b) checking the transmit link of processor J by processor I to determine if a signal "processor I calling me" is present, which is indicative of processor J receiving the "Calling Code_J: signal" signal from processor I;

(c) acknowledging the presence of said "processor I calling me" signal by processor I, by placing a signal "Yes, J Called" on processor I's transmit link; and (d) establishing a connection between processor I and processor J in response to the acknowledgement of step 3 (c).

4. A method of establishing communication between n processors connected by n multi-drop links, where n is an integer, said method comprising the steps of:

assigning each one of said n processors a different predetermined one of said n multi-drop links as a contention free transmit link;

assigning each one of said n processors a different unique calling code;

transmitting by a first one of said n processors on its assigned transmit link the unique calling code of a second one of said n processors with which said first one of said n processors wants to establish a connection for communication purposes;

checking all links other than its own transmit link, by said second one of said n processors to determine if it is receiving its own calling code on the assigned transmit link of another one of said n processors;

determining that said second one of said n processors is not already busy; and establishing a connection between said first and second one of said n processors following the determination that said second one of said n processors is not already busy, and in response to said second one of said n processors determining that said first one of said n processors is transmitting said second one of said n processors unique calling code on said first one of said n processors assigned transmit link.

* * * * *